US 7,089,197 B1

United States Patent
de Freitas

(10) Patent No.: US 7,089,197 B1
(45) Date of Patent: Aug. 8, 2006

(54) SYSTEM AND METHOD FOR VERIFICATION OF CUSTOMER INFORMATION ENTERED VIA AN INTERNET BASED ORDER ENTRY SYSTEM

(75) Inventor: John E. de Freitas, Denver, CO (US)

(73) Assignee: MCI, LLC, Basking Ridge, NJ (US)

( * ) Notice: Subject to any disclaimer, the term of this patent is extended or adjusted under 35 U.S.C. 154(b) by 457 days.

(21) Appl. No.: 09/566,321

(22) Filed: May 8, 2000

(51) Int. Cl.
*G06Q 30/00* (2006.01)

(52) U.S. Cl. .......................... 705/26; 370/352; 705/27
(58) Field of Classification Search .................. 705/26, 705/27; 370/352
See application file for complete search history.

(56) References Cited

U.S. PATENT DOCUMENTS

| | | | | |
|---|---|---|---|---|
| 5,748,742 A | * | 5/1998 | Tisdale et al. ................. | 380/49 |
| 5,790,645 A | * | 8/1998 | Fawcett et al. ............. | 379/189 |
| 6,029,154 A | * | 2/2000 | Pettitt ........................... | 705/44 |
| 6,122,624 A | * | 9/2000 | Tetro et al. ..................... | 705/44 |
| 6,185,416 B1 | * | 2/2001 | Rudokas et al. ............. | 455/410 |
| 6,212,266 B1 | * | 4/2001 | Busuioc ....................... | 379/189 |
| 6,336,109 B1 | * | 1/2002 | Howard ......................... | 706/25 |
| 6,351,453 B1 | * | 2/2002 | Nolting et al. ............... | 370/234 |
| 6,430,305 B1 | * | 8/2002 | Decker .......................... | 382/116 |
| 6,496,831 B1 | * | 12/2002 | Baulier et al. ............... | 707/101 |
| 6,516,056 B1 | * | 2/2003 | Justice et al. ................ | 379/145 |
| 6,526,389 B1 | * | 2/2003 | Murad et al. .................... | 705/10 |
| 6,535,728 B1 | * | 3/2003 | Perfit et al. .................. | 455/410 |

FOREIGN PATENT DOCUMENTS

| | | | |
|---|---|---|---|
| EP | 0884919 A2 | * | 12/1998 |
| WO | WO 00/23909 | | 4/2000 |
| WO | WO 00/23909 A1 | * | 4/2000 |
| WO | WO 01/31483 A2 | * | 3/2001 |
| WO | WO 01/31483 | | 5/2001 |

OTHER PUBLICATIONS

Cybersource, CyberSource enhances Internet fraud screen to combat credit card fraud, M2 Presswire, Jun. 2001.*
Netflow 1, Call accounting morphs into network accounting, Call center solutions, Jul. 1998, vol. 17, iss 1, 5 pages.*

(Continued)

*Primary Examiner*—Mark Fadok

(57) ABSTRACT

A method for the verification of customer information entered via an Internet based order entry system, including the steps of generating an order list containing a plurality of call records corresponding to Internet based customer requests for a plurality of fulfillment items, said call records containing a plurality of data fields; storing said order list in a database; determining a plurality of search criteria; extracting a results list from said order list, said results list containing a plurality of matching call records that match said plurality of search criteria, said matching call records containing a plurality of data fields; comparing said plurality of data fields of said matching call records contained in said results list with a plurality of data fields contained in call records of at least one additional customer information database; verifying said results list as containing authentic customer information upon a match with said call records of said customer information database to release said fulfillment items; and denying release of said fulfillment items for those matching call records contained in said results list that do not match said call records of said additional customer information database.

24 Claims, 5 Drawing Sheets

OTHER PUBLICATIONS

Netflow 2, Cisco, HP team up on internet platform, Computer dealer news, May 25, 1998, vol. 14, iss 20, 2 pages.*
Netflow 3, HP, Cisco team to offer ISPs tracking platform, HP chronical, Jun. 1998, vol. 15, issue 7, 3 pages.*
HP white paper, billing mediation, dated Mar. 2000, pulled from the internet Dec. 31, 2003.*
Equinox 1, Equinox exposes fraud, Telephony, Aug. 9, 1999, vol. 237, iss 6, p. 18, 2 pages.*
Equinox 2, Equinox releases enhanced call record search utility system, BusinessWire, Dec. 13, 1999.*
Equinox 3, http://web.archive.org/web/20000424235135/http://www.equinoxis.com/powerful_products.htm, dated Apr. 24, 2000, 2 pages.*
Equinox 4, EDCO aquires TCP/IP mediation system from equinox information systems, BusinessWire, dated May 18, 1999, 2 pages.*
Equnox 5, Minisota's largest integrated comminications provider chooses equinox software suite, BusinessWire, Oct. 25, 1999, 2 pages.*
ClearCommerce 1, Commerce service provice orbit selects clearcommerce hosting engine to process online transactions, PR Newswire, Sep. 17, 1998, 2 pages.*
Clearcommerce 2, clearcommerce fraudanalyser white paper, dated Mar. 2001, 11 pages pulled from the internet Dec. 31, 2003.*
Chiranky, Lisa, Mixing web sites and call centers: can this marriage really work?, Telemarketing and call center solutions, Jun. 1997, vol. 15, iss 12, 6 pages.*
Martin, John, wireless prepaid billing: a global overview, Telecommunications, Sep. 1999, val 33, issue 9, 5 pages.*
M2 Presswire, Exxcom: Exxcom launches internet service, Apr. 20, 2000, 2 pages.*
Barbetta, Frank, Internet billing starts ticking, telephony, Jun. 22, 1998, vol. 234, issue 25, p. 20, 7 pages.*
Erricsson press release, EHPT launches IP business suite for raising new types of internet revenue, dated Oct. 7, 1999.*
O'connell, Brian, Plugging IT security leaks, Bank technology news, Dec. 1999, 5 pages.*
Debit Card News, A Processor looks to Combat Fraud Using Tools From A Debit Warehouse, Dated Jan. 18, 1999.*
No Author, "Cybersource Enhances Internet Fraud Screen to Combat Credit Card Fraud" M2 Presswire, Jun. 5, 2001, p. 1-2.

* cited by examiner

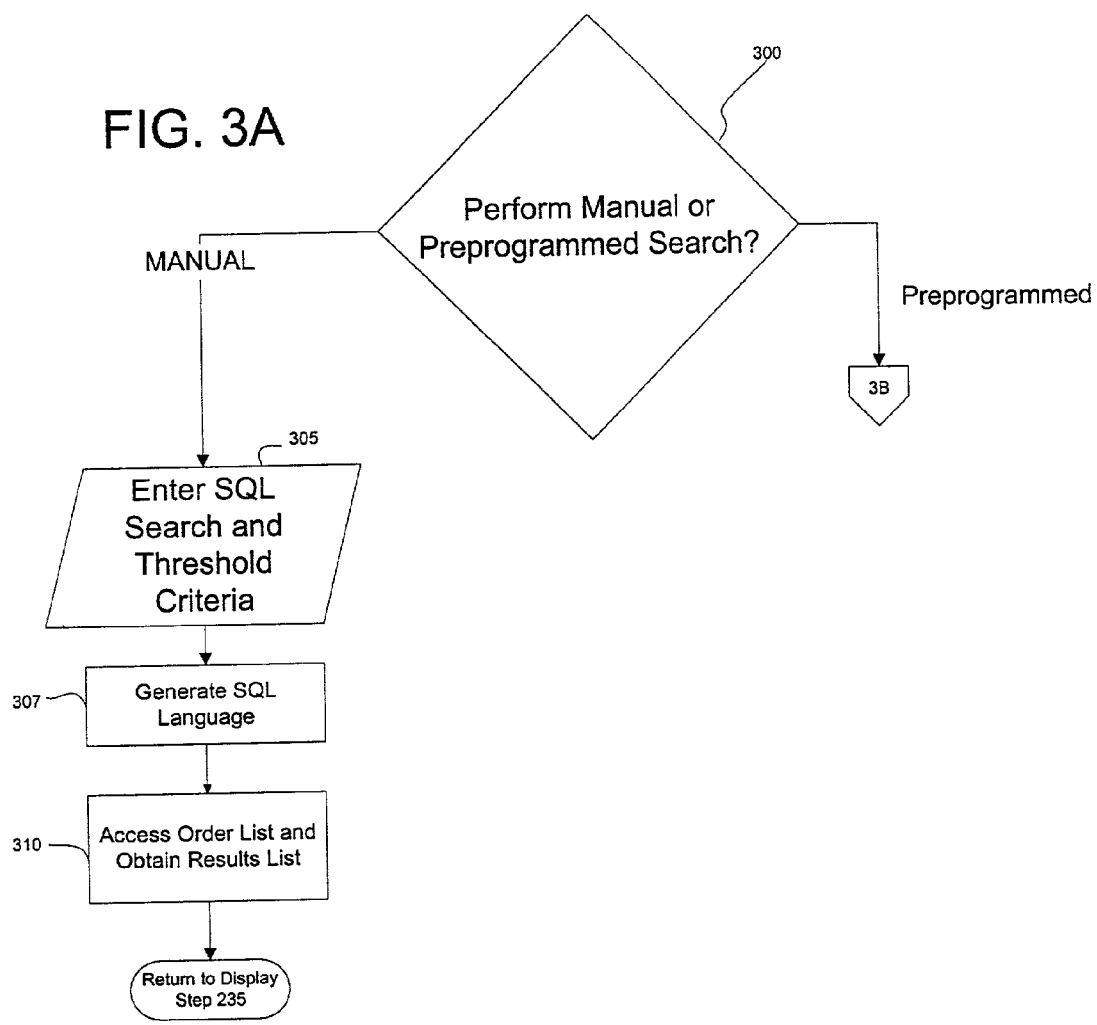

SYSTEM AND METHOD FOR VERIFICATION OF CUSTOMER INFORMATION ENTERED VIA AN INTERNET BASED ORDER ENTRY SYSTEM

BACKGROUND

1. Technological Field

The present invention relates generally to the prevention of the fraudulent subscription for telecommunication services. In particular, the present invention relates to a system and method for the verification of customer information entered via an Internet based order entry system. The system and method prevents a person from fraudulently obtaining calling cards and other fulfillment items obtained through an Internet based sales channel.

2. Description of the Related Art

Fraud is an ever increasing problem in the telecommunications industry, costing the telecommunications companies millions of dollars each year. While long distance carriers are continually developing products to detect and prevent fraud at all stages, there still remain many techniques that are used to perpetuate fraud. The fraud can be as simple as using a stolen credit card to charge a long distance call, or it can involve sophisticated looping techniques, such as repeatedly calling a private branch exchange (PBX) system, finding the correct sequence to access an outside line (by trial and error or other hacking techniques) and then placing a costly long distance call through the PBX system. The telecommunications industry is involved in an intensive and ongoing effort to first identify different types of fraud and then to develop and implement ways of preventing such fraud.

Particular methods of fraud control and systems for implementing them are known in the industry. Conceptually, fraud control may be divided into two disciplines. The first being identifying a call that is likely to be fraudulent and the second being responding after a call is identified as likely to be fraudulent. Methods of identifying calls that are likely to be fraudulent vary from the simple to the sophisticated and are generally directed at a particular type of fraudulent activity. For example, a call is likely to be fraudulent if it is made using a calling card that has been reported stolen by the owner. Another example of fraudulent activity that is common is fraudulently obtaining calling cards or other fulfillment items, such as cash certificates, using a false name, address, or telephone number over the Internet.

Due to the ease and broad availability of the Internet, it is now possible, and even easier, to register for long distance services via the Internet. Furthermore, long distance companies do not, as of yet, have the means to validate the accuracy of the customer information submitted prior to releasing fulfillment items such as calling cards or cash certificates without impacting the timeliness of Internet-based transaction, the objectives of the Internet-based transactions include speed and efficiency for the user, to name a few as non-limiting examples. Subsequently, individuals are able to order services, gain access to long distance networks, or obtain calling cards without submitting valid billing names and addresses. Since many long distance companies support Internet based ordering of telephone products, and the setup and maintenance of telephone accounts via the Internet, a greater exposure exists from orders originating via the Internet that may ultimately lead to losses associated with Internet based subscription fraud.

Therefore, there exists a need for a process and system that allows a fraud control analyst to monitor, via a web browser interface, daily Internet transactions requesting fulfillment items for potential fraudulent activity prior to actual release of the fulfillment item. In the event the fulfillment item was released to the customer, a fraud analyst will have the opportunity to promptly deactivate the item, such as the card, certificate, etc.

SUMMARY OF THE INVENTION

It is therefore an object of the present invention to provide a system and method for the verification of customer information entered via an Internet based order entry system that minimizes subscription fraud by reviewing order request transactions prior to the release of fulfillment items.

It is an additional object of the present invention to provide a system and method for the verification of customer information entered via an Internet based order entry system that is accessible by a fraud control analyst via a web browser interface.

It is another object of the present invention to provide a system and method for the verification of customer information entered via an Internet based order entry system that enables a fraud control analyst to query daily order transactions using certain search criteria such as zip code, city, state, name, and address.

It is also an object of the present invention to provide a system and method for the verification of customer information entered via an Internet based order entry system that generates an alert based upon atypical or suspicious order patterns.

It is similarly an object of the present invention to provide a system that verifies Internet based order entry information based upon customer information contained in additional customer information databases.

To achieve the above and other objects of the present invention, there is provided a system and method for the verification of customer information entered via an Internet based order entry system comprising a customer database or new order processing system (NOPS), an Internet based verification server, an order entry interface for interfacing with NOPS, and an Internet sales channel interface for interfacing with the order entry interface.

A plurality of fraud control analysts access the Internet based verification server using the world wide web and a standard Internet web browser by entering a secure login name and password. The fraud control analysts enter specific search criteria such as city, state, zip code, customer name, address, etc., and query a list of orders that originated through the Internet sales channel interface. The Internet based verification server generates a results list based upon the search criteria entered from the fraud control analyst and displays the results on the fraud control analyst's display. Once the results list is returned to the fraud control analysts, they have the option of verifying the results. If they decide to verify the results, the verification server accesses customer information databases from either the long distance company's customer information database or other customer information databases of cooperating telephone companies, as well as any other accessible databases storing customer information. The process of accessing the additional databases allows the system to verify the information entered via the Internet sales channel interface and thus reduces the potential fraudulent entry of information. If the information is not found in the other databases, the verification server generates an alert to the fraud control analyst for further consideration. In this manner, the fraud control analysts can verify the information using other known methods and if unsuccessful, may prevent the distribution of fulfillment items such as calling cards and cash certificates prior to shipment. If the customer information is deemed to be fraudulent, the fraud control analyst is able to submit a request to NOPS in order to deny the release of fulfillment items or negate the ability to use the fulfillment items.

BRIEF DESCRIPTION OF THE DRAWINGS

These and other objects and features of the present invention will become apparent from the following detailed description considered in connection with the accompanying drawings in which:

FIG. 3A is a detailed flowchart of the step of performing a manual search as set forth in FIG. 2A.

DETAILED DESCRIPTION OF THE PREFERRED EMBODIMENT

Figure 1:
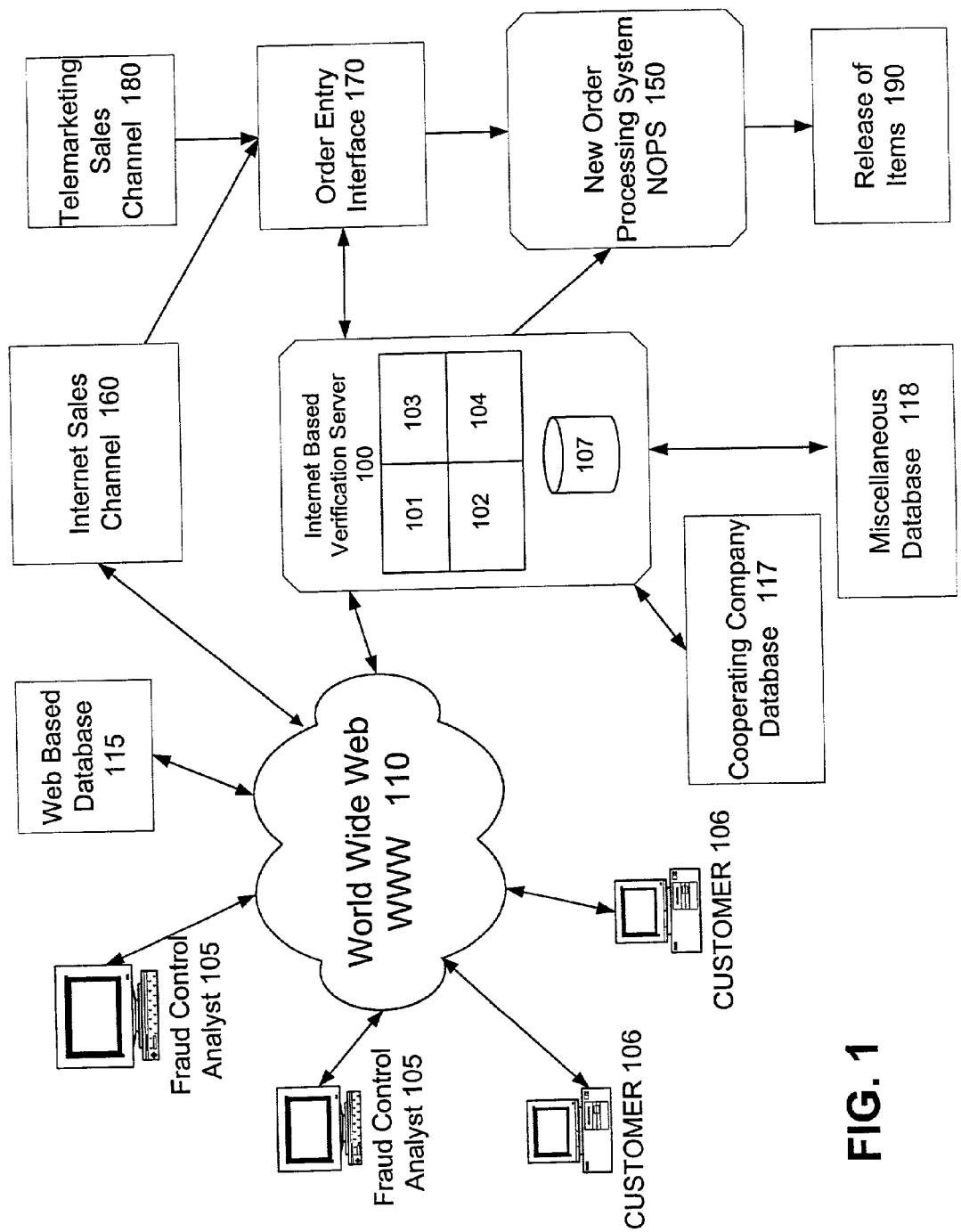
FIG. 1 is a schematic view of a system for the verification of customer information entered via an Internet based order entry system according to the present invention.

Referring now to the drawings, in which similar reference characters denote similar or identical elements throughout the several views, FIG. 1 shows a system for the verification of customer information entered via an Internet based order entry system according to the present invention.

A plurality of customers 106 access an Internet sales channel 160 via the world wide web 110 to request fulfillment items such as calling cards and cash certificates from long distance telephone companies. Customers 106 enter any required information into Internet sales channel 160 and the entered data is modified into an acceptable format by an order entry interface 170. The information is then submitted to a new order processing system NOPS 150 for processing.

The system for the verification of customer information entered via an Internet based order entry system is comprised of new order processing system (NOPS) 150 which processes and stores all customer data and orders for fulfillment items, order entry interface 170 which may receive raw information from Internet sales channel interface 160 and a telemarketing phone sales interface 180. Order entry interface 170 formats the raw information into a pre-selected format and presents the information to NOPS 150 for processing.

An Internet based verification server 100 is comprised of a means for accessing 101 order entry interface 170 and a processor means 102 for generating an order list of Internet based orders requesting fulfilment items that originated through the Internet sales channel interface 160 and/or telemarketing channel 180. The order list contains a plurality of call records corresponding to Internet based customer requests for a plurality of fulfillment items. Each call record contains a plurality of data fields. Processor means 102 formats the order list into a pre-selected format and stores the order list as a plurality of call detail records in a database 107. In addition, processor means 102 extracts from the order list a results list that contains a plurality of matching call records that fulfill a plurality of search criteria entered via a fraud control analyst 105. Verification server 100 has verification means 104 for verifying the matching call records in the results list. In addition, verification server 100 has communication means 103 for accessing additional customer information databases and for generating and sending a block or alert message to NOPS 150 in order to prevent the release of fulfillment items.

While a first embodiment of the system could run automatically and deny the release of fulfillment items for any matching call record that does not appear in any additional customer information database, a preferred embodiment generates an alert to a fraud control analyst if the information is not found. The alert allows the fraud analyst to check the customer information using other known methods. If the fraud analyst decides that the information is fraudulent, request for fulfillment items can be canceled.

In the preferred embodiment, fraud control analyst 105 accesses verification server 100 via a web browser interface and enters a plurality of search criteria using a workstation connected to the world wide web (W W W) 110. Fraud control analyst 105 accesses verification server 100 using a secure login name and password to prevent the unauthorized use of the system. Once verification server 100 generates the results list, it is displayed on a display of the fraud control analyst 105.

The resulting list is displayed to fraud control analyst 105 for subsequent fraud analysis. Fraud control analyst 105 has the option of confirming the information submitted through Internet sales channel 160 using several independent customer information databases. The customer information databases may include a cooperating company database 117, a web-based database 115, or a miscellaneous database 118 accessible either through world wide web 110 or through standard telephone lines via modem using communication means 103. Cooperating company database 117 may include a customer information database of another long distance telephone company or a database of a local utility company. Web based database 115 and miscellaneous database 118 may include any database that contains customer information and is accessible for the purpose of verifying submitted customer information.

Figure 2A:
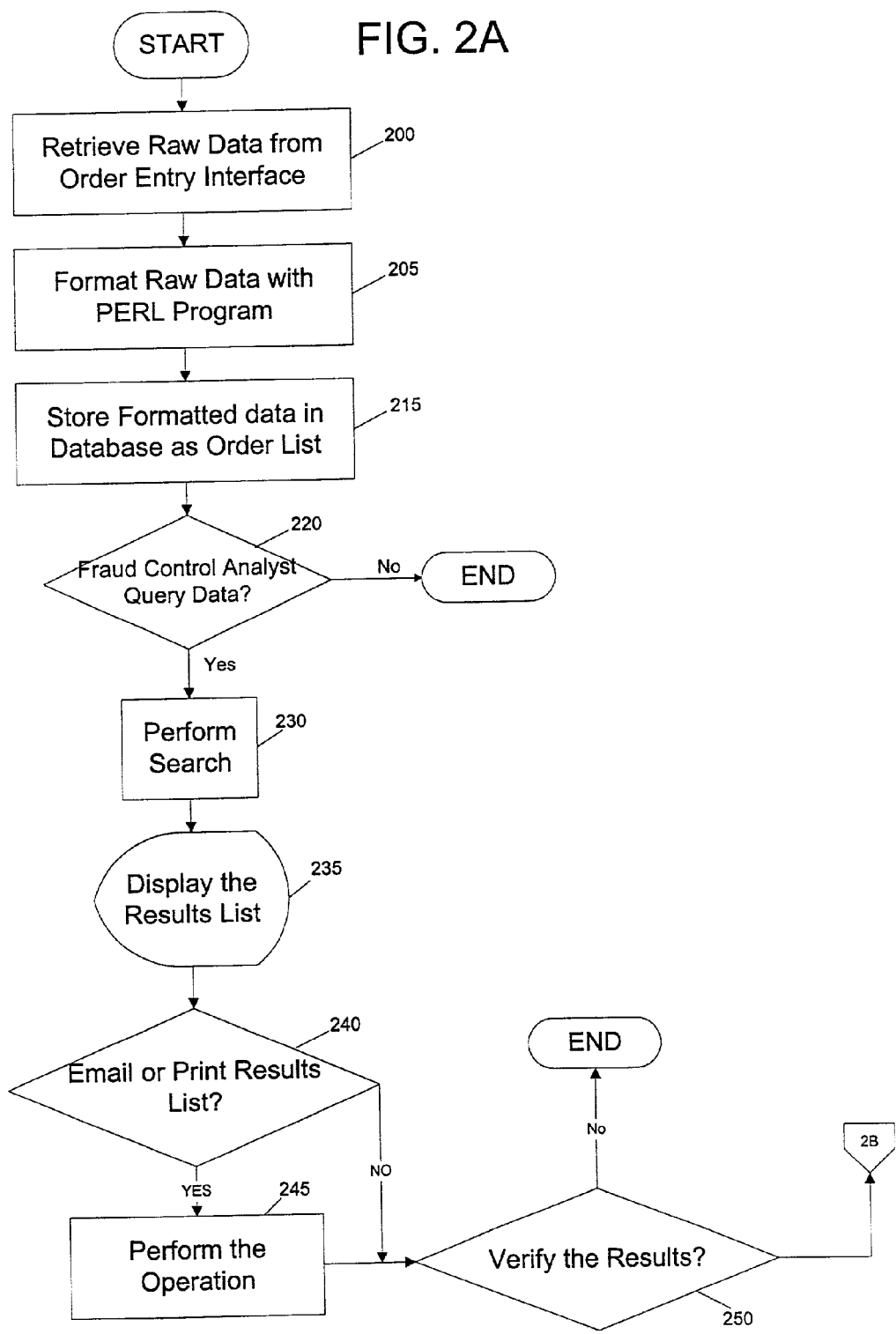
FIG. 2A is a flowchart illustrating a method for the verification of customer information entered via an Internet based order entry system according to the present invention.
Figure 2B:
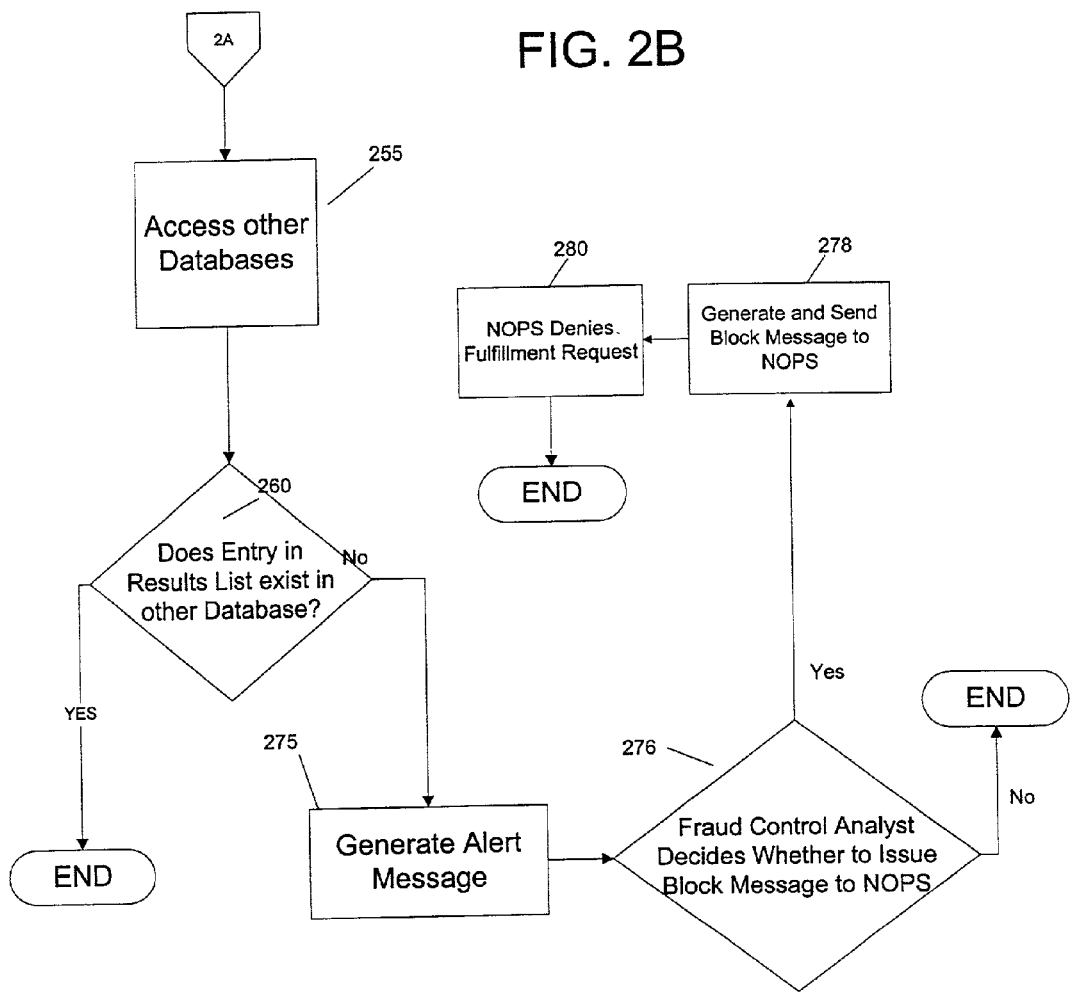
FIG. 2B is a continuation of the method for the verification of customer information entered via an Internet based order entry system according to FIG. 2A.

Referring now to FIGS. 2A and 2B, there is shown a method for the verification of customer information entered via an Internet based order entry system according to the present invention. Referring to step 200, verification server 100 retrieves raw call data from order entry interface 170. The raw data originates from Internet sales channel 160 and/or telemarketing sales channel 180, and contains the customer information input by customers ordering Internet based fulfillment items. The raw data contains several data fields of varying lengths and may contain customer information including the customer's name, address, zip code, state, time of request, date of request, and requested fulfilment items, etc. The raw data is formatted by verification server 100, in step 205, preferably using a PERL computer program. PERL is an interpreted computer programming language that is optimized for scanning arbitrary text files, extracting information from those text files, and printing reports based on that information. The PERL program modifies the raw data and converts the data to a pre-selected format. The PERL program may modify the date format, limit the number of fields imported, or re-order the number of fields imported in order to ease the import of the data into verification server 100. The formatted data is then stored in database 107 as an order list in step 215. The order list contains a plurality of call records corresponding to Internet based customer requests for a plurality of fulfillment items and the call records contains a plurality of data fields.

At step 220 it is determined whether or not fraud control analyst 105 wishes to query the order list based upon a plurality of search criteria. If the fraud control analyst does not wish to query the order list, the program ends. If, however, the analyst wishes to enter search criteria, the procedure performs a search on the information stored in the order list in step 230, the details of which are set forth hereinbelow with respect to FIGS. 3A and 3B.

The returned data is in the form of a results list. The results list contains a plurality of matching call records that match the plurality of search criteria and the plurality of search criteria thresholds. The results list returned from the search performed in step 230 is displayed in step 235, preferably on the fraud control analyst's computer terminal or any other suitable output device. At step 240, it is determined whether or not the results list should be e-mailed or printed. If the fraud control analyst wishes to e-mail or print the results list, at step 245 the requested task is performed and the process proceeds to step 250; otherwise, the process proceeds directly to step 250. At step 250, it is determined whether the fraud control analyst wishes to verify the listings contained in the results list. If the fraud control analyst does not wish to verify the listings, the procedure ends. If, however, the fraud control analyst does wish to verify the listings, the system accesses the customer information contained in a plurality of additional databases using communication means 103 in step 255, as shown in FIG. 2B. The additional databases containing customer information may be a database of a cooperating company 117 or a web based database 115 located and accessible through the world wide web 110. In addition, the customer database may be a miscellaneous database 118 accessible via a modem over standard telephone lines. Cooperating company database 117 may include a customer information database of another long distance telephone company or a database of a local utility company. Web based database 115 and miscellaneous database 118 may include any database that contains customer information and is accessible for the purpose of verifying submitted customer information. Typically, large companies allow limited access to their customer databases for the purpose of verifying customer data. In addition, some companies accept an electronic request to verify customer data. The request is answered in the affirmative if the data submitted matches data contained in their database.

At step 260, it is determined whether or not the matching call records in the results list exist in the additional databases. If the information is contained in the other databases, the information is considered truthful as it has been verified in an additional, possibly independent database. At this point, the program ends. Since NOPS 150 has received a request for the fulfillment of services via order entry interface 170, no further action is required if the information submitted by customer 106 has been successfully compared with customer data stored in an independent database.

If, however, the information contained in the results list is not found in an additional database in step 260, the information may be fraudulent. In step 275, processor means 102 generates an alert message to fraud control analyst 105, activates an alert flag and sends the message via communication means 103. At step 276, it is determined whether the fraud control analyst wants to issue a block message to NOPS 150 indicating a potentially fraudulent entry. While at step 276 the fraud control analyst 105 has the option to issue a block message, it is, however, understood that the process can be fully automated to deny the fulfilment of items for any customers who are not contained in any of the accessible databases. If the fraud control analyst decides to issue the block message, verification server 100 generates and sends the message in step 278. Upon receipt of the block message, NOPS 150 does not proceed to release the items 190, but instead blocks the order at step 280. Accordingly, obtaining fulfillment items fraudulently is prevented prior to the release of the fulfillment items based on the information provided by customer 106. If fraud control analyst 105 decides not to issue the block message at step 276, the process ends.

Referring now to FIG. 3A, there is shown a detailed flowchart describing a manual search process performed in step 230 of FIG. 2A. At step 300, it is determined whether or not the search to be performed is a manual search or a preprogrammed search. If the search is a manual search, fraud control analyst 105 enters a plurality of search criteria and their corresponding threshold values in step 305. In step 307, processor means 102 generates a corresponding structured query language (SQL) statement for the search. In step 310, processor means 102 uses the SQL statement to access the orders list stored in database 107 in order to obtain matching call records that match the search criteria. The matching records are then stored as a results list. The results list obtained by processor means 102 is displayed in step 235 to fraud (control analyst 105.

Figure 3B:
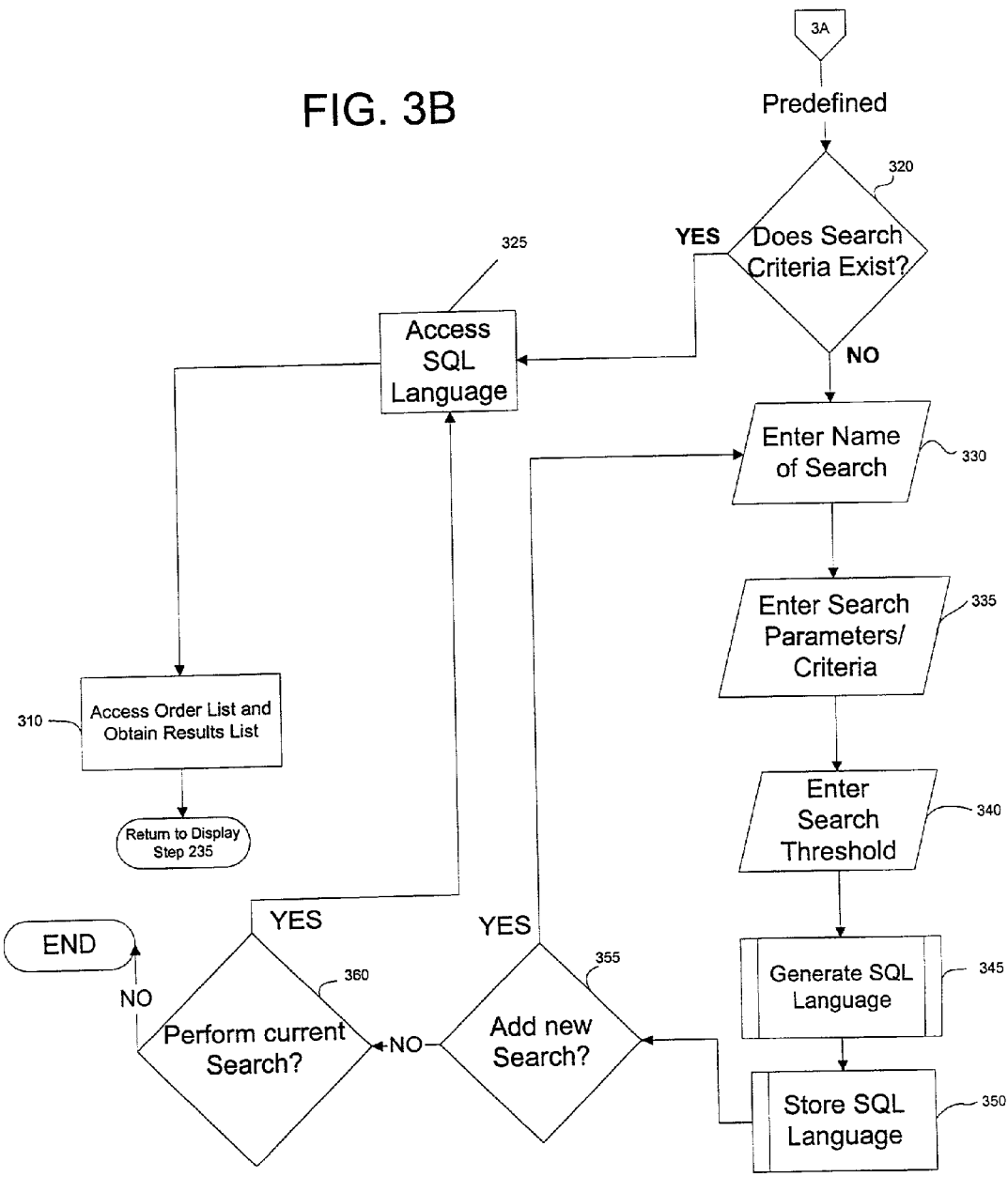
FIG. 3B is a detailed flowchart of the step of performing a preprogrammed search as set forth in FIG. 2A.

Referring now to FIG. 3B, if the search is a preprogrammed search, at step 320 it is determined whether or not the preprogrammed search criteria exists. Preprogrammed searches are searches previously stored using common search criteria. For instance, the frequency of requests based upon a particular zip code may trigger an alert in one area and not another. If, for example, a particular combination of search criteria and threshold information routinely results in the prevention of fraud, the search can be saved for future reference. If the search does exist and the SQL language has been previously stored, the previously stored SQL language is accessed at step 325 and the process proceeds to step 310.

If the search has not been previously defined, the process proceeds to step 330. Step 330 requests fraud control analyst 105 to enter the name of the predefined search. Following step 330, fraud control analyst 105 is requested to enter the search parameters/criteria at step 335. The fraud control analyst is then requested to enter specific search thresholds for each search parameter/criteria at step 340. Specifically, the search thresholds are values which, when exceeded, will result in an alert. The thresholds entered in the step 340 may be previously defined atypical or suspicious patterns of call transactions. An example of an atypical pattern is the frequency of requests within a given period of time. For example, the request for five calling cards in a period of two days may signal a fraudulent attempt to obtain calling cards for illegal purposes. These thresholds are entered for the particular search parameters and result in the creation of a results list for later reference. Accordingly, the results list would be compared with the customer information contained in additional databases to determine whether or not the customer information provided exists in other databases.

Referring to step 345, processor means 102 generates the SQL language corresponding to the entered search parameters and the thresholds. The SQL language is then stored in step 350 for future reference.

At step 355, it is determined whether or not to add an additional search. If so, the process returns to step 330 so that the user may enter the name of the new search. If not, it is determined at step 360 whether or not the fraud control analyst wishes to perform the previously defined search. If so, the process returns to step 325 wherein the processor means 102 accesses the SQL language previously stored in step 350. The SQL language is then used to access database 107 in step 310 and the results are displayed at step 325. If the previously defined search is not to be performed, the process ends.

While several embodiments of the present invention have been shown and described, it is to be understood that many changes and modifications may be made thereto without departing from the spirit and scope of the invention as defined in the appended claims.

What is claimed is:

1. A method for verification of customer information entered via an Internet based order entry system comprising:
   generating an order list containing a plurality of call records corresponding to Internet based customer requests for a plurality of fulfillment items, said call records containing a plurality of data fields;
   storing said order list in a database;
   determining a plurality of search criteria;
   extracting a results list from said order list, said results list containing a plurality of matching call records that match said plurality of search criteria, said matching call records containing a plurality of data fields;
   comparing said plurality of data fields of said matching call records contained in said results list with a plurality of data fields contained in call records of at least one additional customer information database;
   verifying said results list as containing authentic customer information upon a match with said call records of said at least one additional customer information database to release said fulfillment items; and
   denying release of said fulfillment items for those matching call records contained in said results list that do not match said call records of said at least one additional customer information database.

2. The method according to claim 1, wherein said at least one additional customer information database includes a customer information database of a cooperating company, wherein said cooperating company is one of a long distance telephone company or a utility company that allows access to customer information for purposes of comparing customer information.

3. The method according to claim 1, wherein said at least one additional customer information database includes an Internet based customer information database accessible through the world wide web, wherein said Internet based database is accessible for purposes of comparing customer information.

4. The method according to claim 1, further comprising:
   determining thresholds for said plurality of search criteria; and
   extracting to said results list, a plurality of matching call records that match said thresholds.

5. The method according to claim 4, wherein said plurality of search criteria and said thresholds for said plurality of search criteria are input manually.

6. The method according to claim 4, wherein said thresholds include a frequency of order entries within a specified time.

7. The method according to claim 1, wherein said plurality of search criteria includes a customer's name, a customer's zip code, and a customer's address.

8. The method according to claim 1, wherein said plurality of search criteria includes a date and a time of said Internet based order entry.

9. The method according to claim 1, further comprising storing said results list in said database.

10. The method according to claim 1, wherein said plurality of data fields of said call records contain at least a customer name field, a customer address field, and a type of fulfillment item field requested.

11. The method according to claim 1, wherein said comparing further comprises:
    generating an alert message to a fraud control analyst for those matching call records that are not contained in said at least one additional customer information database; and
    allowing the fraud control analyst the option of verifying those matching call records that are not contained in said at least one additional customer information database.

12. The method according to claim 1, wherein said denying release of fulfillment items further includes:
    generating a block message for those matching call records contained in said results list that do not match said call records of said at least one additional customer information database; and
    sending said block message to a new order processing system, wherein said new order processing system blocks release of the fulfillment items if the block message is received and corresponds to said call records corresponding to Internet based customer requests in said order list.

13. The method according to claim 1, wherein said extracting further includes:
    generating a corresponding structured query language (SQL) statement for said plurality of search criteria; and
    querying said order list stored in the database using said SQL statement in order to obtain said plurality of matching call records.

14. The method according to claim 1, further comprising displaying said results list on a display to a fraud control analyst.

15. A system for verification of customer information entered via an Internet based order entry system comprising:
    means for generating an order list containing a plurality of call records corresponding to Internet based customer requests for a plurality of fulfillment items, said call records containing a plurality of data fields;
    means for storing said order list in a database;
    means for determining a plurality of search criteria;
    means for extracting a results list from said order list, said results list containing a plurality of matching call records that match said plurality of search criteria, said matching call records containing a plurality of data fields; and
    means for comparing said plurality of data fields of said matching call records contained in said results list with a plurality of data fields contained in call records of at least one additional customer information database to verify said results list as containing authentic customer information upon a match with said call records of said at least one additional customer information database to release said fulfillment items, said comparing means denying release of fulfillment items for those matching call records contained in said results list that do not match said call records of said at least one additional customer information database.

16. The system according to claim 15, wherein said at least one additional customer information database includes a customer information database of a cooperating company, wherein said cooperating company is one of a long distance telephone company or a utility company that allows access to their customer information for purposes of comparing customer information.

17. The method according to claim 15, wherein said at least one additional customer information database includes an Internet based customer information database accessible through the world wide web, wherein said Internet based database is accessible for purposes of comparing customer information.

18. The system according to claim 15, wherein said plurality of data fields of said call records contain at least a customer name field, a customer address field, and a type of fulfillment item field requested.

19. The system according to claim 15, wherein said comparing means further comprises:
   means for generating an alert message to a fraud control analyst for those matching call records that are not contained in said at least one additional customer information database, to allow the fraud control analyst the option of verifying those matching call records that are not contained in said at least one additional customer information database.

20. The system according to claim 15, wherein said comparing means denies release of fulfillment items by generating a block message for those matching call records contained in said results list that do not match said call records of said at least one additional customer information database, and sending said block message to a new order processing system, wherein said new order processing system blocks release of the fulfillment items if the block message is received and corresponds to said call records corresponding to Internet based customer requests in said order list.

21. The system according to claim 15, wherein a fraud analyst determines a plurality of search criteria thresholds, wherein said results list includes a plurality of matching call records that match said plurality of search criteria thresholds.

22. The system according to claim 21, wherein said plurality of search criteria thresholds include a frequency of order entries within a specified time.

23. The system according to claim 15, wherein said plurality of search criteria includes a customer's name, a customer's zip code, and a customer's address.

24. The system according to claim 15 wherein said plurality of search criteria includes a date and a time of said Internet based order entry.

* * * * *